(12) United States Patent
Shiraki et al.

(10) Patent No.: US 12,140,151 B2
(45) Date of Patent: Nov. 12, 2024

(54) TURBO FAN

(71) Applicant: MABUCHI MOTOR CO., LTD., Chiba (JP)

(72) Inventors: Kenji Shiraki, Chiba (JP); Hideki Yoshiura, Chiba (JP); Tetsushi Yoshikawa, Chiba (JP); Sakie Kawakami, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/352,247

(22) Filed: Jul. 14, 2023

(65) Prior Publication Data

US 2024/0026897 A1    Jan. 25, 2024

(30) Foreign Application Priority Data

Jul. 19, 2022  (JP) .................................. 2022-114855

(51) Int. Cl.
*F04D 29/28*     (2006.01)
*B23K 20/10*     (2006.01)

(52) U.S. Cl.
CPC ............ *F04D 29/281* (2013.01); *B23K 20/10* (2013.01)

(58) Field of Classification Search
CPC ............................... F04D 29/281; F04D 29/28
See application file for complete search history.

(56) References Cited

U.S. PATENT DOCUMENTS

| | | | |
|---|---|---|---|
| 6,805,531 B2* | 10/2004 | Iida ....................... | F04D 29/281 416/185 |
| 6,881,033 B2* | 4/2005 | Makinson ........... | F04D 13/0606 417/423.12 |
| 10,072,669 B2* | 9/2018 | Shen ..................... | F04D 29/281 |
| 2005/0071998 A1* | 4/2005 | Rocky .................. | B29C 66/322 29/889 |
| 2021/0254482 A1* | 8/2021 | Park ........................ | F01D 5/02 |

FOREIGN PATENT DOCUMENTS

JP           6899245 B2      7/2021

* cited by examiner

*Primary Examiner* — Michael L Sehn
(74) *Attorney, Agent, or Firm* — HAUPTMAN HAM, LLP (57) ABSTRACT

A turbo fan, formed by ultrasonic welding, a first component including: a flat portion; and plate-shaped blade portions standing from the flat portion, and a second component having recessed groove portions in each of which an end portion of the respective blade portion fits. The groove portions have a groove width greater than a thickness of the end portions of the blade portions. The turbo fan includes a group of positioning ribs partially burying two clearances created on two sides of the end portion in a thickness direction thereof, respectively, in a pre-welding state. The group of positioning ribs protrude in the thickness direction from the end portion of at least one of the blade portions, or from side surfaces of at least one of the groove portions, and are in contact with side surfaces of the groove portion, or in contact with the end portion of the blade portion.

7 Claims, 6 Drawing Sheets

ONE SIDE

↑ AXIAL DIRECTION
↓

THE OTHER SIDE

FIG. 1

ONE SIDE

AXIAL DIRECTION

THE OTHER SIDE

FIG. 2

ONE SIDE

↑

AXIAL DIRECTION

↓

THE OTHER SIDE

FIG. 3

ONE SIDE

↑

AXIAL DIRECTION

↓

THE OTHER SIDE

TURBO FAN

RELATED APPLICATIONS

The present application claims priority to Japanese Application No. 2022-114855 filed Jul. 19, 2022, the disclosure of which is hereby incorporated by reference herein in its entirety.

BACKGROUND

1. Technical Field

The present disclosure relates to a turbo fan formed by welding together a first component including a plurality of blade portions and a second component by ultrasonic welding.

2. Description of the Related Art

A turbo fan is conventionally known in which a plurality of blade portions placed around the rotation center is sandwiched between two flat plate components facing each other. For example, Japanese Patent No. 6899245 discloses a turbo fan including a vaned shroud molded integrally with a plurality of blade portions, and a center plate. In Japanese Patent No. 6899245, the turbo fan including the two flat plate components (the vaned shroud and the center plate) is formed by fitting the plurality of blade portions into a plurality of fitting portions recessed in the center plate, and welding the fitting portions and the blade portions together by ultrasonic welding.

If two components are welded together by ultrasonic welding to form a turbo fan as in Japanese Patent No. 6899245, the two components are required that portions (unwelded portions) of the components, excluding the welded portions, are not in contact with each other before welding. In other words, the two components are required to create a clearance to avoid contact between the unwelded portions. Consequently, it is possible to appropriately direct flash produced during welding, and also to prevent the distribution of vibrating energy of ultrasonic welding. On the other hand, the above-mentioned clearance is created between the two components and therefore there is backlash between the two components. Consequently, it is difficult to stabilize the positions of the two components relative to each other before welding and to mount the two components with accuracy.

The present disclosure has been devised considering such problems, and one object thereof is to increase the positioning accuracy of two components relative to each other before welding while achieving a function of appropriately directing flash produced during ultrasonic welding and a function of preventing the distribution of vibrating energy. Note that the present disclosure is not limited to this object, and exerting operations and effects derived from configurations revealed in the description of the embodiments described below, the operations and effects being unattainable by the known technology, is also another object of the present disclosure.

SUMMARY

A turbo fan of the disclosure can be achieved as aspects or application examples that are disclosed below, and solves at least a part of the above problems.

(1) A turbo fan disclosed herein is a turbo fan formed by welding together, by ultrasonic welding, a first component including: a flat portion that extends along a direction orthogonal to a rotation center; and a plurality of plate-shaped blade portions that is provided in such a manner as to stand from the flat portion and is provided around the rotation center in such a manner as to extend outward from the rotation center side, and a plate-shaped second component that is provided with a plurality of recessed groove portions in each of which an extended end portion of the respective blade portion fits. The groove portions have a groove width greater than a thickness of the end portions of the blade portions. The turbo fan includes one group of positioning ribs that partially bury two clearances created on two sides of the end portion in a thickness direction thereof, respectively, in a state where the end portion fits in the groove portion. The one group of positioning ribs protrude in the thickness direction from the end portion of at least one of the plurality of blade portions and are in contact with side surfaces of the groove portion, or protrude in the thickness direction from side surfaces of at least one of the plurality of groove portions and are in contact with the end portion of the blade portion.

(2) In a case of (1) above, it is preferable that each of the blade portions include a plurality of welding ribs that protrudes from an end surface of the end portion and is heated during the welding of the first component and the second component. In this case, it is preferable that the plurality of welding ribs extend discontinuously along an extending direction of the end portion. Moreover, in this case, it is preferable that the positioning ribs be located in a break between the plurality of welding ribs in the extending direction of the end portion, or be located in a break between the plurality of welding ribs in an extending direction of the groove portion in a state where the end portion fits in the groove portion.

(3) In a case of (1) or (2) above, it is preferable that the positioning rib provided to one of the two clearances be equal in the amount of protrusion in the thickness direction to the positioning rib provided to the other clearance.

(4) In a case of any of (1) to (3) above, it is preferable that the positioning ribs be in linear contact with the side surfaces of the groove portion in a depth direction of the groove portion, or be in linear contact with the end portion in a standing direction of the blade portion.

(5) In a case of (4) above, it is preferable that the positioning ribs have an arc shape as viewed in a direction of the rotation center.

(6) In a case of any of (1) to (5) above, it is preferable that the end portions of the blade portions have a curved shape as viewed in the direction of the rotation center. In this case, it is preferable that the one group of positioning ribs be provided to the groove portion. Moreover, in this case, it is preferable that the positioning rib provided to one of the two clearances and the positioning rib provided to the other clearance be placed, coinciding with normals at positions where the positioning ribs are in contact with the end portion, respectively.

(7) In a case of any of (1) to (6) above, it is preferable that the positioning ribs do not protrude from the clearances in the direction of the rotation center.

(8) In a case of any of (1) to (7) above, it is preferable that the one group of positioning ribs be provided to each of the end portions of two or more blade portions located equally spaced around the rotation center among the plurality of blade portions, or to each of the groove portions in which the respective aforementioned end portions fit.

According to a turbo fan of the disclosure, it is possible to increase the positioning accuracy of two components relative to each other before welding while achieving a function of appropriately directing flash produced during ultrasonic welding and a function of preventing the distribution of vibrating energy.

DESCRIPTION OF THE EMBODIMENTS

A turbo fan as an embodiment is described with reference to the drawings. The embodiment revealed below is simply provided for illustrative purposes. It is not intended to exclude the application of various modifications and technologies that are not specified in the following embodiment. The configurations of the embodiment can be modified in various manners without departing from the gist thereof, and carried out. Moreover, the configurations of the embodiment can be selected as necessary, or combined as appropriate.

[1. Configuration]

Figure 1:
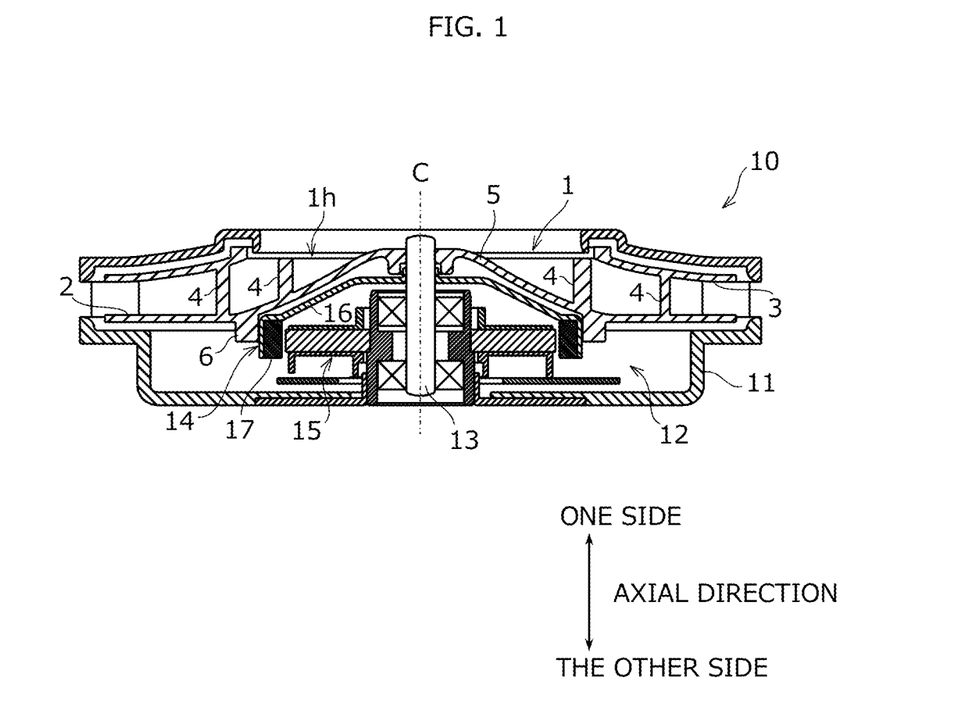
FIG. 1 is an axial cross-sectional view of a fan motor to which a turbo fan according to an embodiment is applied.
Figure 2:
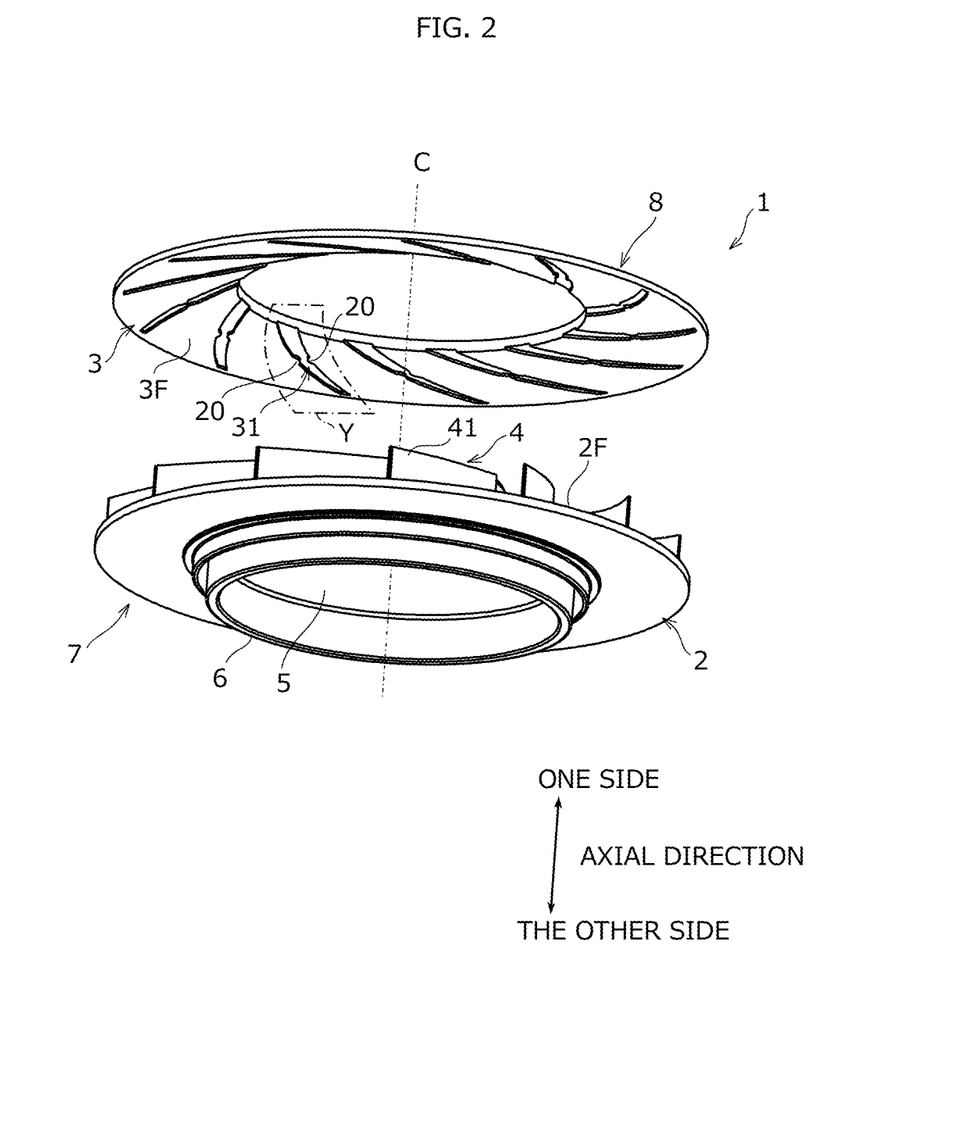
FIG. 2 is an exploded perspective view illustrating a state before the turbo fan of FIG. 1 is formed.

FIG. 1 is an axial cross-sectional view of a fan motor 10 to which a turbo fan 1 according to the embodiment is applied. FIG. 2 is a perspective view illustrating a state before the turbo fan 1 according to the embodiment is formed. As illustrated in FIG. 2, the turbo fan 1 of the embodiment is equipped with two components 7 and 8, and is formed by welding the two components 7 and 8 together by ultrasonic welding to integrate the two components 7 and 8 into a single unit. The turbo fan 1 is a fan that sends air taken in from a rotation center C side outward (in a direction away from the rotation center C), and is also called a centrifugal fan.

Hereafter, a direction in which the rotation center C of the turbo fan 1 extends is referred to as the axial direction (a direction of the rotation center). A direction orthogonal to the rotation center C, the direction being away from the rotation center C, is referred to as the radial direction/radially. A direction orthogonal to the rotation center C, the direction turning around the rotation center C, is referred to as the circumferential direction. As illustrated in FIG. 1, the fan motor 10 is configured, including the turbo fan 1, and a motor unit 12 as a drive source that rotates the turbo fan 1 in a housing 11 that forms the skin of the fan motor 10.

The motor unit 12 includes a shaft 13, a rotor 14 that rotates integrally with the turbo fan 1 via the shaft 13, and a stator 15 placed inside the rotor 14. In short, the fan motor 10 is what is called an outer rotor brushless motor. The rotation center of the shaft 13 agrees with the rotation center C of the turbo fan 1. The rotor 14 is provided with a cup-shaped rotor yoke 16, and a magnet 17 fixed to an inner peripheral surface of the rotor yoke 16. In the embodiment, the rotor yoke 16 has an approximately truncated conical outer shape that has an outer diameter smaller on one side in the axial direction (the upper side in the drawing) than on the other side in the axial direction (the lower side in the drawing). The shaft 13 is press-fitted and fixed on a radially inner side of the rotor yoke 16. Consequently, the rotor 14 rotates integrally with the shaft 13 and the turbo fan 1.

As described above, the turbo fan 1 is a fan that sends outward the air taken in from the rotation center C side, and includes two plate-shaped flat portions 2 and 3 that are placed, facing each other in the axial direction, and a plurality of blade portions 4 placed between the two flat portions 2 and 3. One of the two flat portions 2 and 3 is provided with and penetrated in the axial direction by a hole 1h forming an intake air guide path of the turbo fan 1. The turbo fan 1 is illustrated by example in which the flat portion 3 placed on the one side in the axial direction (hereinafter referred to as the "second flat portion 3") is provided with the hole 1h for the intake air guide path. In short, the turbo fan 1 of the embodiment sends radially outward the air taken in from the one side in the axial direction, and the second flat portion 3 has an annular shape with the hole 1h formed on the radially inner side. Note that the second flat portion 3 illustrated herein by example is inclined toward the other side in the axial direction relative to the radial direction, increasingly from the inner side in the radial direction toward the outer side in the radial direction. However, the shape of the second flat portion 3 is not limited to the above shape, and may not be inclined relative to the radial direction.

The flat portion 2 placed on the other side in the axial direction (hereinafter referred to as the "first flat portion 2") has an annular shape that is orthogonal to the rotation center C. Moreover, a radially inner portion of the first flat portion 2 is provided with a boss portion 5 and a fitting portion 6. The boss portion 5 is a portion that supports the shaft 13 and covers the rotor yoke 16 from the one side in the axial direction, and has an approximately truncated conical outer shape matching the outer shape of the above-mentioned rotor yoke 16. An end portion of the shaft 13 on the one side in the axial direction is fixed (for example, press-fitted and fixed) on a radially inner side of the boss portion 5. The fitting portion 6 is an annular portion that protrudes from the radially inner portion of the first flat portion 2 toward the other side in the axial direction. The rotor yoke 16 is internally fitted and bonded to the fitting portion 6. The boss portion 5 is fixed to the end portion of the shaft 13 on the one side in the axial direction, and also the fitting portion 6 is externally fitted and bonded to the rotor yoke 16 to fix the turbo fan 1 in such a manner as to be unrotatable relative to the shaft 13 and the rotor 14.

One of the two components 7 and 8 forming the turbo fan 1, the first component 7, includes one of the above-mentioned two flat portions 2 and 3, and the plurality of blade portions 4. Moreover, the other second component 8 includes the other of the above-mentioned two flat portions 2 and 3. As illustrated in FIG. 2, the turbo fan 1 of the embodiment is equipped with the first component 7 including the first flat portion 2 and the plurality of blade portions 4, and the second component 8 including the second flat portion 3. The first component 7 also includes the boss portion 5 and the fitting portion 6. In the first component 7, the first flat portion 2, the blade portions 4, the boss portion 5, and the fitting portion 6 are integrally molded. In short, the first component 7 is a component obtained by integrally molding the portions 2 to 6 included in the above-mentioned turbo fan 1, excluding the second flat portion 3, and the second component 8 is the second flat portion 3 itself.

Figure 3:
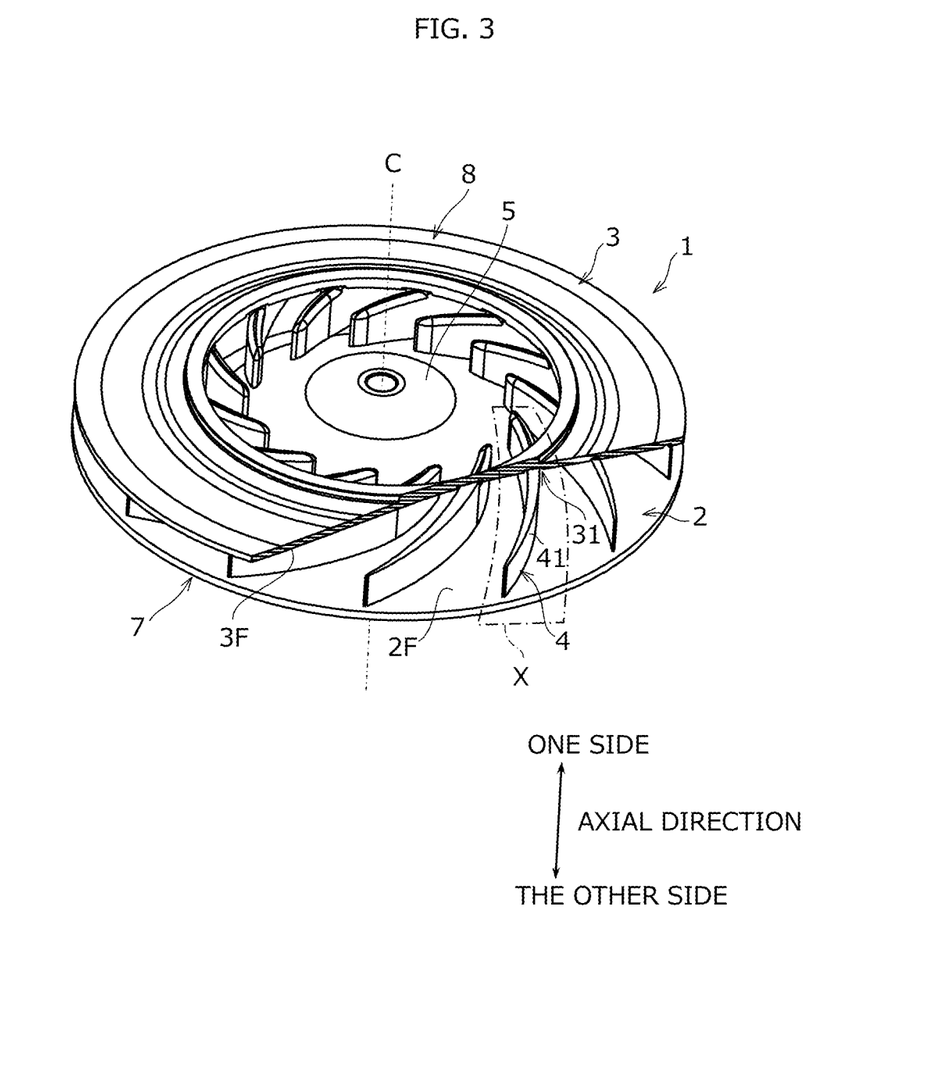
FIG. 3 is a partial cross-sectional perspective view of the turbo fan of FIG. 1.
Figure 4:
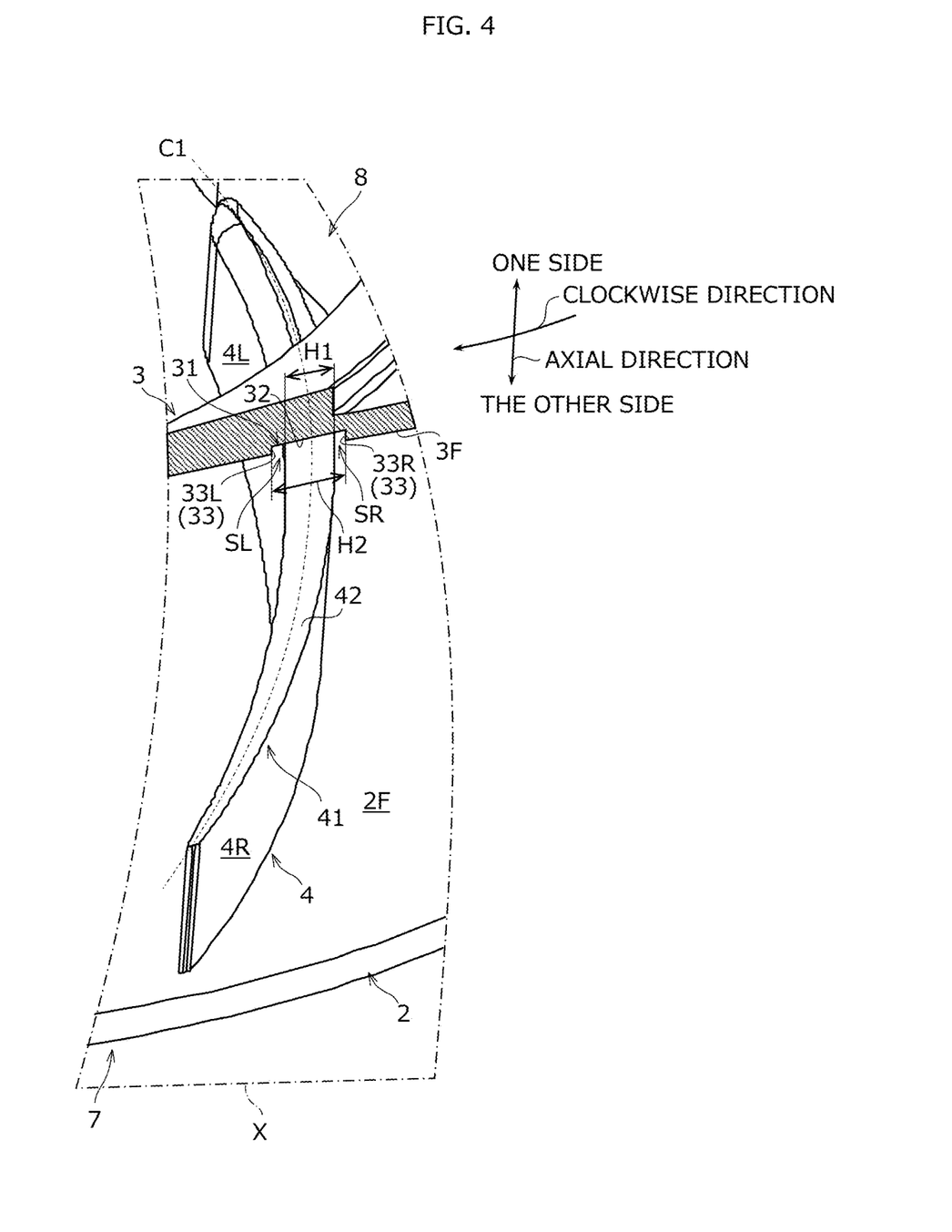
FIG. 4 is an enlarged view of part X of FIG. 3.

As illustrated in FIGS. 3 and 4, the turbo fan 1 is formed by fitting end portions 41, which are on the one side in the axial direction, of the plurality of blade portions 4 included in the first component 7 into groove portions 31 of the second flat portion 3 included in the second component 8, and welding the end portions 41 and the groove portions 31 together by ultrasonic welding. More specifically, welding ribs 43 (refer to FIG. 5), which are described below, of the end portions 41 and bottom surfaces 32 (refer to FIG. 4), which are described below, of the groove portions 31 are joined by ultrasonic welding. Hereafter, a state before the first component 7 and the second component 8 are welded together by ultrasonic welding is referred to as the "pre-welding state," and a state after the first component 7 and the second component 8 are welded together (the state illustrated in FIGS. 3 and 4) is referred to as the "post-welding state." The pre-welding state includes a state where the end portions 41 of the blade portions 4 fit in the groove portions 31.

As illustrated in FIG. 3, the plurality of blade portions 4 is provided in such a manner as to stand from a first surface 2F, which faces the second flat portion 3, of the first flat portion 2. Moreover, each of the blade portions 4 forms a plate shape that is provided around the rotation center C in such a manner as to extend outward, that is, radially outward, from the rotation center C side. In the embodiment, a standing direction of the blade portions 4 agrees with the axial direction. Moreover, the turbo fan 1 of the embodiment rotates counterclockwise as viewed from the one side in the axial direction, and an extending direction of the blade portions 4 curves in such a manner that a radially outer portion of the each of the blade portions 4 is shifted in a clockwise direction relative to a radially inner portion as viewed from the one side in the axial direction. Note that when the turbo fan 1 rotates clockwise as viewed from the one side in the axial direction, the extending direction of the blade portions 4 may curve in such a manner that the radially outer portion of the each of the blade portions 4 is shifted in the counterclockwise direction relative to the radially inner portion as viewed from the one side in the axial direction. Hereafter, a direction orthogonal to both of the extending direction (longitudinal direction) and the axial direction (standing direction) of the blade portions 4 is referred to as the "thickness direction."

The plurality of blade portions 4 all have the same shape, and are spaced equally apart from one another in such a manner as to circle the rotation center C. Note that 13 blade portions 4 are illustrated by example in the embodiment. However, the number of the blade portions 4 is not limited to 13. Moreover, in terms of the blade portions 4 of the embodiment, a thickness H1 in the extending direction (a dimension in the thickness direction) is not uniform, and the thickness H1 is increasingly reduced from the rotation center C side toward the outer side. The thickness H1 of the blade portions 4 may be uniform in the extending direction.

As illustrated in FIG. 4, the each of the plate-shaped blade portions 4 has two surfaces 4L and 4R facing in opposite directions in the circumferential direction. During the rotation of the turbo fan 1, one of the two surfaces 4L and 4R is a pressure surface that presses wind out, and the other is a suction surface. Hereafter, one of the two surfaces 4L and 4R, which faces in the clockwise direction in the circumferential direction as viewed from the one side in the axial direction, is referred to as the first blade surface 4L, and the other facing in the counterclockwise direction is referred to as the second blade surface 4R. Moreover, the terms "clockwise" and "counterclockwise" referred to in the following description mean directions as viewed from the one side in the axial direction.

Figure 5:
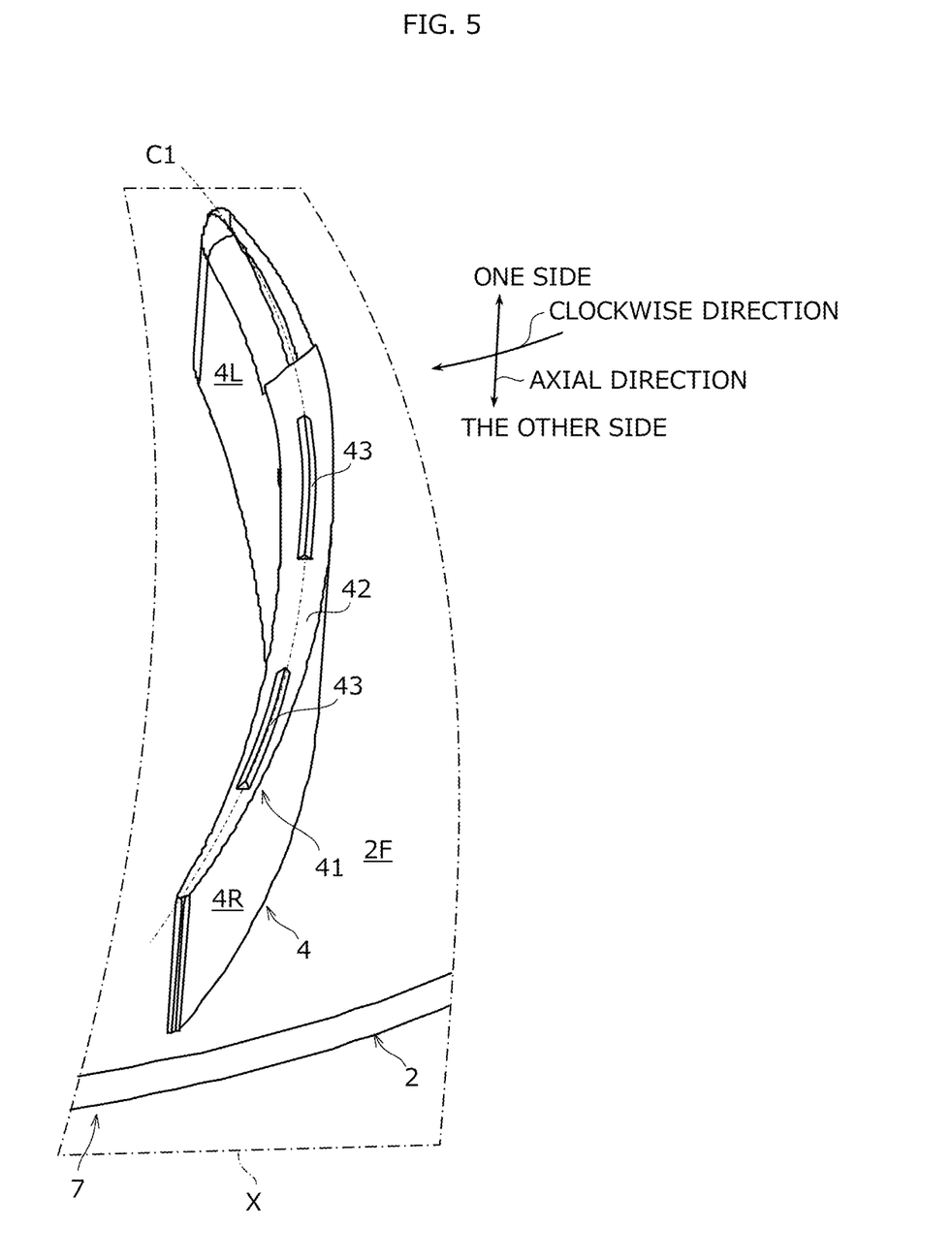
FIG. 5 is an enlarged view of a part (the part illustrated in FIG. 4) of a first component in a state before the first component included in the turbo fan of FIG. 1 is welded to a second component.

In the pre-welding state, the end portion 41 of the each of the blade portions 4 is provided with a plurality of the welding ribs 43 that protrudes from an end surface 42 of the end portion 41 as illustrated in FIG. 5. The welding ribs 43 are portions that are joined to the bottom surfaces 32 of the groove portions 31 as described above, and are heated and melted during the welding of the first component 7 and the second component 8 (hereinafter simply referred to as "during welding"). Note that the end surface 42 is a surface on a distal end surface (a surface intersecting the standing direction of the blade portions 4, the surface extending in the thickness direction and in the extending direction) of the each of the blade portions 4 provided in such a manner as to stand. The welding ribs 43 protrude from the end surfaces 42 in the same direction as the standing direction of the blade portions 4. The plurality of the welding ribs 43 extends discontinuously along the extending direction of the end portion 41. Two welding ribs 43 provided apart in the extending direction from each other are illustrated here by example. The shape of each of the welding ribs 43 has, for example, a triangular prism shape that protrudes from the end surface 42 in such a manner that the top is located on a center line C1 in the thickness direction (hereinafter referred to as the "thickness center line C1") of the end portion 41.

As illustrated in FIG. 2, the second flat portion 3 is provided with a plurality of the groove portions 31 that is recessed toward the one side in the axial direction into the second surface 3F, which faces the first flat portion 2, of the second flat portion 3. The end portions 41 of the plurality of blade portions 4 fit in the plurality of the groove portions 31, respectively, before welding. Hence, the same number of the groove portions 31 as the number of the blade portions 4 (13 in the embodiment) is provided. Moreover, the shape of the groove portions 31 fits the outer shape of the blade portions 4 as viewed in the axial direction, and the groove portions 31 are provided along the extending direction of the blade portions 4.

Figure 6:
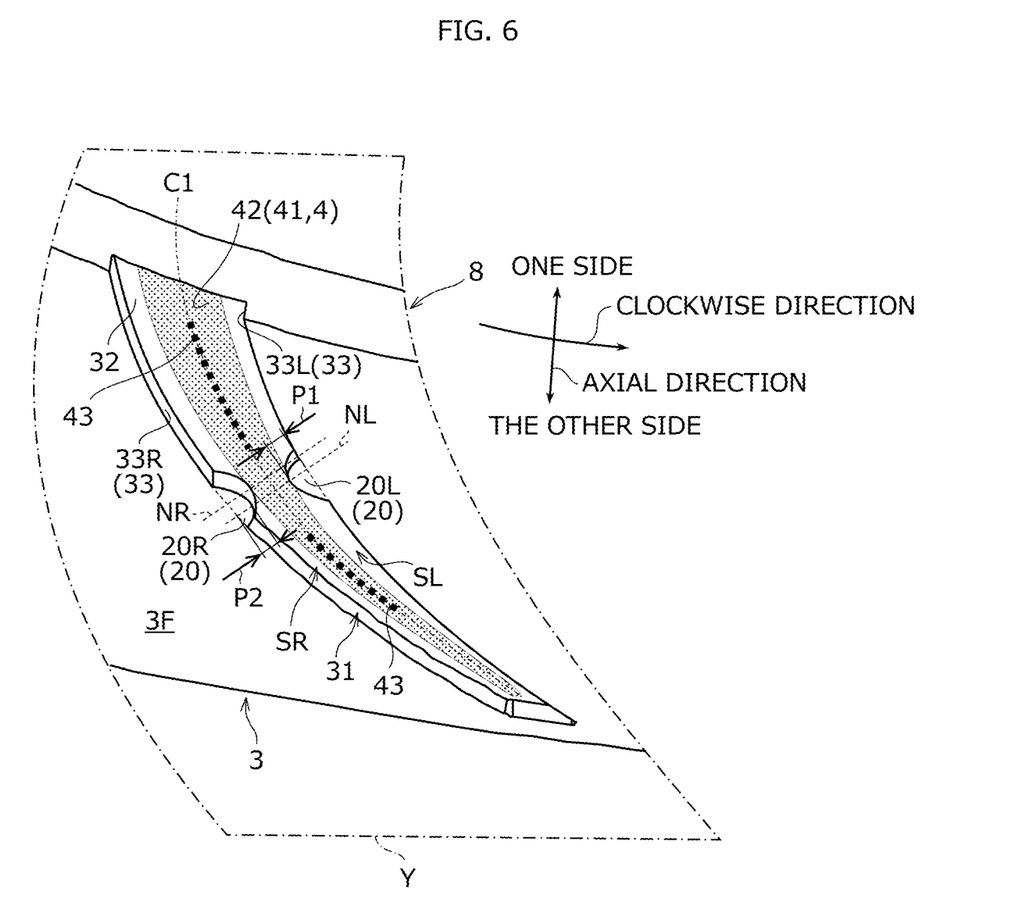
FIG. 6 is an enlarged view of part Y of FIG. 2.

As illustrated in FIG. 4, each of the groove portions 31 has a U-shape in cross section, which includes the bottom surface 32 located on the one side in the axial direction relative to the second surface 3F, and two side surfaces 33 connecting two edges of the bottom surface 32 in the circumferential direction and the second surface 3F. Of the two side surfaces 33, a first side surface 33L that is placed, facing the first blade surface 4L of the end portion 41 in the pre- or post-welding state, is shifted in the circumferential direction toward the clockwise direction relative to the first blade surface 4L, and extends along the extending direction, as illustrated in FIGS. 4 and 6. Moreover, of the two side surfaces 33, a second side surface 33R that is placed, facing the second blade surface 4R of the end portion 41 in the above state, is shifted in the circumferential direction toward the counterclockwise direction relative to the second blade surface 4R, and extends in the extending direction. The bottom surface 32 of the each of the groove portions 31 is bonded to the end surface 42 of the respective end portion 41 in the post-welding portion.

As illustrated in FIG. 4, a groove width H2 being a dimension in a width direction orthogonal to an extending direction and a depth direction of the each of the groove portions 31, is set to be greater than the thickness H1 of the end portion 41 of its corresponding blade portion 4 (that fits in the aforementioned groove portion 31). Consequently, clearances SL and SR are formed between the groove portion 31 and the end portion 41 in the thickness direction of the each of the blade portions 4. Note that the thickness H1 of the blade portions 4 is not uniform in the extending direction in the embodiment. Therefore, the groove width H2 is not uniform in the extending direction accordingly. The groove width H2 is increasingly reduced from the rotation center C side toward the outer side.

As described above, the groove portions 31 are designed to have the groove width H2 greater than the thickness H1 of the end portions 41 of the blade portions 4. Therefore, it is difficult for the blade portions 4 to touch the side surfaces 33 of the groove portions 31. As a result, it is possible to prevent the distribution of vibrating energy during welding. Hence, the first component 7 and the second component 8 are welded together more reliably. Moreover, it is possible to direct flash produced during welding to the clearances SL and SR created between the groove portions 31 and the end portions 41. Therefore, it is possible to prevent the flash produced during welding from being exposed to an air way. Hence, it is possible to improve the finished appearance after welding. Furthermore, it is also possible to contribute to the suppression of wind noise due to the influence of the flash produced during welding. On the other hand, the groove width H2 is made greater than the thickness H1 of the groove portions 31. Consequently, there is backlash between the groove portions 31 and the end portions 41 in the circumferential direction and in the radial direction (radial direction). Consequently, there is a problem that the positions of the two components 7 and 8 relative to each other are likely to be unstable in the pre-welding state, and it is difficult to mount the two components 7 and 8 with accuracy.

Hence, the turbo fan 1 of the embodiment is provided with a structure that prevents the displacement of the two components 7 and 8 from each other in the circumferential direction and in the radial direction in the pre-welding state. Specifically, the turbo fan 1 is provided with positioning ribs 20 (refer to FIGS. 2 and 6) that partially bury the two clearances SL and SR created on two sides of each of the end portions 41 in the thickness direction in the pre-welding state, respectively. One group of the positioning ribs 20 is provided to at least one of the plurality of the groove portions 31, or the end portion 41 of at least one of the plurality of blade portions 4. In other words, in the turbo fan 1, one group of the positioning ribs 20 is provided to one or more groove portions 31, or one group of the positioning ribs 20 is provided to the end portion 41 of one or more blade portions 4.

In the turbo fan 1 of the embodiment, one group of the positioning ribs 20 is provided to each of the plurality of the groove portions 31 (that is, each of all of the groove portions 31) as illustrated in FIG. 2. Moreover, as illustrated in FIG. 6, one group of the positioning ribs 20 protrude in the thickness direction from the side surfaces 33 (the first side surface 33L and the second side surface 33R) of the each of the groove portion 31, respectively, and are in contact with the end portion 41 of the respective blade portion 4. The term "contact" described here means a state of touching a target (the end portion 41) to come into contact with, to the extent that does not press the target.

In the embodiment, one group of the positioning ribs 20 includes one first positioning rib 20L that protrudes from the first side surface 33L of the groove portion 31 toward the second side surface 33R, and one second positioning rib 20R that protrudes from the second side surface 33R of the groove portion 31 toward the first side surface 33L. In short, one group of the positioning ribs 20 includes a pair of the first positioning rib 20L and the second positioning rib 20R. Note that in FIG. 6, a portion where on the bottom surface 32 of the groove portion 31, the end surface 42 of the end portion 41 is bonded in the post-welding state is illustrated in a dot pattern. Moreover, in FIG. 6, a portion where on the bottom surface 32 of the groove portion 31, the welding ribs 43 of the blade portion 4 are in contact with in the pre-welding state is illustrated with thick dotted lines.

The position of each of the positioning ribs 20 to be provided is set, for example, near the center of the end portion 41 in the extending direction. In the embodiment, the position of the each of the positioning ribs 20 to be provided is set at a position that is near the center of the end portion 41 in the extending direction and does not coincide with the plurality of the welding ribs 43, that is, a position that is a break between the plurality of the welding ribs 43.

The first positioning rib 20L and the second positioning rib 20R are placed in such a manner as to coincide with normals NR and NL at positions where the first positioning rib 20L and the second positioning rib 20R are in contact with the end portion 41. In short, the first positioning rib 20L is placed in such a manner as to coincide with the normal NR to the second positioning rib 20R, and the second positioning rib 20R is placed in such a manner as to coincide with the normal NL to the first positioning rib 20L. In this manner, two (a pair of) positioning ribs 20 provided across the end portion 41 are placed at substantially the same position in the extending direction of the end portion 41. Note that the normals NL and NR described here are straight lines that extend in directions orthogonal to tangents at the positions where the positioning ribs 20L and 20R are in contact with the end portion 41 as viewed in the axial direction. If a protruding surface of the each of the positioning ribs 20 is inclined in the depth direction of the groove portion 31, a direction orthogonal to a tangent at a contact position (point, line, or surface) is assumed to be a normal.

The each of the positioning ribs 20 has, for example, an approximately semi-circular cylindrical shape forming an arc as viewed in the axial direction. In other words, the each of the positioning ribs 20 is formed by a part of a circular cylinder having a center line along the axial direction. Moreover, the protruding surface of the each of the positioning ribs 20 (that is, the circumferential surface of the each of the approximately semi-circular cylindrical positioning ribs 20) extends parallel to the depth direction of the groove portion 31 and to the standing direction of the end portion 41 in the pre-welding state. Consequently, a portion of the each of the positioning ribs 20, the portion protruding furthest from the first side surface 33L or the second side surface 33R, is in linear contact with the first blade surface 4L or the second blade surface 4R of the end portion 41, in the standing direction of the end portion 41.

If the each of the positioning ribs 20 has an approximately semi-circular cylindrical shape, a radius of curvature thereof is preferably small within a range where the positioning ribs 20 can be molded. As the radius of curvature of the each of the positioning ribs 20 is reduced, the contact area between the positioning rib 20 and the end portion 41 is reduced. Therefore, it is possible to prevent the distribution of vibrating energy during welding. Note that the each of the positioning ribs 20 is not limited to the above shape, and may have a shape that is in surface contact with the respective end portion 41 in the standing direction of the blade portion 4. Surface contact of the each of the positioning ribs 20 with the respective end portion 41 further facilitates agreement between the extending direction of the end portion 41 and the extending direction of the groove portion 31. Therefore, the oscillations of the blade portions 4 in the pre-welding state and during welding are prevented further.

Moreover, in the embodiment, an amount of protrusion, P1, of the first positioning rib 20L in the thickness direction is set to be equal to an amount of protrusion, P2, of the second positioning rib 20R in the thickness direction. In other words, the length of the protrusion of the first positioning rib 20L from the first side surface 33L (the amount of protrusion, P1) is set to be equal to the length of the protrusion of the second positioning rib 20R from the second side surface 33R (the amount of protrusion, P2). Consequently, it is possible to place the end portion 41 in the center of the groove portion 31 in the thickness direction. In other words, it is possible to place the end portion 41 in a state where the center line of the groove portion 31 in the width direction substantially agrees with the thickness center line C1 of the end portion 41. Hence, it is possible to form the clearance SL between the first side surface 33L and the first blade surface 4L equally to the clearance SR between the second side surface 33R and the second blade surface 4R. Moreover, an end surface, which is on the other side in the axial direction, of the each of the positioning ribs 20 is placed in such a manner as not to protrude in the direction of the rotation center C from the clearance SL or SR. The aforementioned end surface is formed in such a manner as to be flush with the second surface 3F.

[2. Operations and Effects]

(1) According to the above-mentioned turbo fan 1, one group of the positioning ribs 20 is provided which partially bury the two clearances SL and SR created between the groove portion 31 and the end portion 41; therefore, it is possible to eliminate backlash between the groove portion 31 and the blade portion 4. Hence, it is possible to increase the positioning accuracy of the first component 7 and the second component 8. Moreover, there is no need to use a jig to position the first component 7 and the second component 8. Therefore, it is possible to simplify the assembly work. In addition, there is also no need to provide through-holes for positioning with a jig to the first component 7 and the second component 8. Therefore, it is also possible to prevent degradation in the function of the turbo fan 1.

Furthermore, the first positioning rib 20L and the second positioning rib 20R, which form one group of the positioning ribs 20, protrude in the thickness direction from the first side surface 33L and the second side surface 33R of the groove portion 31, respectively, and are in contact with the end portion 41. Hence, the two clearances SL and SR can be reliably created between the groove portion 31 and the end portion 41. Therefore, it is possible to avoid bad appearance due to the influence of flash produced during welding and to prevent degradation in the function of the turbo fan 1 due to the flash extended out.

In addition, only the small positioning ribs 20 provided to the groove portions 31 are in contact with the first blade surfaces 4L and the second blade surfaces 4R in the pre-welding state. The first blade surfaces 4L and the second blade surfaces 4R are portions that are not related to the welding of the first component 7 and the second component 8 (unwelded portions). In short, in the pre-welding state, only the small positioning ribs 20 provided to the second component 8 are in contact with the unwelded portions of the first component 7. Consequently, it is possible to prevent vibrating energy during welding from being transmitted to the unwelded portions. Therefore, it is possible to prevent the distribution of vibrating energy during welding. Hence, according to the above-mentioned turbo fan 1, it is possible to increase the positioning accuracy of the two components 7 and 8 relative to each other before welding while achieving the function of appropriately directing flash produced during ultrasonic welding and the function of preventing the distribution of vibrating energy.

(2) In the above-mentioned turbo fan 1, the positioning ribs 20 are located in the break between the plurality of the welding ribs 43 in the extending direction of the end portion 41. In other words, the positioning ribs 20 are provided in the place away from the welding ribs 43 being the portions in which the groove portion 31 and the end portion 41 are welded together. Consequently, it is possible to prevent vibrating energy during welding from being transmitted to the portion in which the positioning ribs 20 are in contact with the end portion 41. Hence, it is possible to further prevent the distribution of the vibrating energy during welding.

(3) Moreover, according to the above-mentioned turbo fan 1, the amount of protrusion, P1, of each of the first positioning ribs 20L and the amount of protrusion, P2, of each of the second positioning ribs 20R are set to be equal to each other. Therefore, it is possible to create the equal clearances SL and SR on the two sides of the each of the end portions 41 in the thickness direction. Hence, it is possible to direct flash produced during welding to the two sides (the clearances SL and SR) of the each of the end portions 41 and to enhance the function of directing flash appropriately.

(4) According to the above-mentioned turbo fan 1, the positioning ribs 20 are in linear contact with the end portions 41 in the standing direction of the blade portions 4. Therefore, it is possible to increase the positioning performance of the blade portions 4 (the bearing capacity of the blade portions 4) with the positioning ribs 20. Moreover, according to the above-mentioned turbo fan 1, it is possible to use the positioning ribs as guides for fitting the blade portions 4 into the groove portions 31, and also it is possible to hold the standing state of the blade portions 4 fitted in the groove portions 31 and to prevent the oscillations of the blade portions 4.

(5) Moreover, it is possible to easily form the positioning ribs 20 that come into linear contact with the end portions 41 by forming the each of the positioning ribs 20 into an arc shape as viewed in the axial direction. There is the fact that it is difficult to form a corner, for example, if the second component 8 is molded with a mold. However, it is possible to easily form the positioning ribs 20 that come into linear contact with the end portions 41 by forming the each of the positioning ribs 20 into an arc shape.

(6) In the above-mentioned turbo fan 1, the first positioning rib 20L and the second positioning rib 20R are placed, coinciding with the normals NR and NL at the positions where the first positioning rib 20L and the second positioning rib 20R are in contact with the end portion 41. Consequently, it is possible to support the end portion 41 from the two sides thereof at substantially the same position in the extending direction of the end portion 41. Therefore, it is possible to increase the positioning accuracy of the blade portions 4 and to further stabilize the attitudes of the blade portions 4.

(7) Moreover, in the above-mentioned turbo fan 1, the positioning ribs 20 do not protrude from the clearances SL and SR in the direction of the rotation center C. In other words, the positioning ribs 20 do not jut out from the clearances SL and SR in the axial direction. Therefore, the air in the turbo fan 1 resists being disturbed. Hence, it is possible to perform positioning without degrading the function of the turbo fan 1.

[3. Others]

The configuration of the turbo fan 1 described in the above-mentioned embodiment is an example, and is not limiting. In the above-mentioned turbo fan 1, one group of the positioning ribs 20 is provided to each of all of the groove portions 31 of the second component 8. However, the positioning ribs 20 are simply required to be provided to at least one groove portion 31.

Moreover, if the positioning ribs 20 are provided to not all the groove portions 31 but a plurality of the groove portions 31, it is preferable that one group of the positioning ribs 20 be provided to each of two or more groove portions 31 that are located equally spaced around the rotation center C. For example, if two groups of the positioning ribs 20 are applied to the turbo fan 1, it is preferable that the two groups of the positioning ribs 20 be provided to two groove portions 31 that are spaced 180 degrees apart around the rotation center C, respectively. The positioning ribs 20 are provided to the groove portions 31 located equally spaced around the rotation center C to further increase the positioning accuracy of the blade portions 4.

In the above-mentioned embodiment, the arc-shaped end surface, which is on the other side in the axial direction, of the each of the positioning ribs 20 is formed in such a manner as to be flush with the second surface 3F. However, the aforementioned end surface may be located closer to the bottom surface 32 than the second surface 3F. At least unless the each of the positioning ribs 20 protrudes in the direction of the rotation center C from at least the clearance SL or SR, the above-mentioned effects can be obtained. Moreover, even if the each of the positioning ribs 20 is formed, protruding slightly from the clearance SL or SR in the direction of the rotation center C (toward the other side in the axial direction), there is no problem in the performance of the turbo fan 1.

The placement of the positioning ribs 20 is not limited to the above-mentioned placement. For example, the first positioning rib 20L and the second positioning rib may not be placed, coinciding with the normals NR and NL at the positions where the first positioning rib 20L and the second positioning rib 20R are in contact with the end portion 41, respectively. In other words, an extending-direction position where the first positioning rib 20L is in contact with the end portion 41 may be displaced relatively greatly from an extending-direction position where the second positioning rib is in contact with the end portion 41. For example, even if the first positioning rib is placed inward in the radial direction and the second positioning rib 20R is placed outward in the radial direction, one group of the positioning ribs 20 can prevent the displacement of the position of the end portion 41. Moreover, the each of the positioning ribs 20 may be placed at a position coinciding with the welding rib 43 in the extending direction of the end portion 41.

The shape of the positioning ribs 20 is not limited to the above-mentioned shape. The shape of the positioning ribs 20 that are in linear contact with the end portions 41 may be, for example, a triangular prism forming a triangular shape in axial view. Moreover, the amount of protrusion, P1, of the first positioning rib 20L may be different from the amount of protrusion, P2, of the second positioning rib 20R. The volumetric capacities of the clearances SL and SR can be made equal, for example, by increasing the amount of protrusion of the positioning rib 20 located on the inner side of the curve of the blade portion 4 as compared to the amount of protrusion of the positioning rib 20 located on the outer side of the curve of the blade portion 4. Consequently, it is possible to secure the function of directing flash appropriately, the function being equivalent to (or greater than) that of the above embodiment.

One group of the positioning ribs 20 is at least required to include at least two positioning ribs 20 that protrude from the two sides in the thickness direction, respectively. For example, one group of the positioning ribs 20 may include a plurality of the first positioning ribs 20L that protrudes from the first side surface 33L, and include a plurality of the second positioning ribs 20R that protrudes from the second side surface 33L, or equivalently one group of the positioning ribs 20 may be configured, including, for example, two first positioning ribs 20L and one second positioning rib 20R.

Moreover, the configuration of the blade portions 4 is not limited to the above-mentioned configuration. The blade portions 4 may not have a curved shape as viewed in the axial direction. For example, the blade portions 4 may be extended in the radial direction, or may be inclined relative to the radial direction. Moreover, the standing direction of the blade portions 4 may be slightly inclined relative to the axial direction. The number of the welding ribs 43 is not limited to two and may be three or more. Moreover, the welding ribs 43 may be omitted, and may be provided to the bottom surfaces 32 of the groove portions 31 instead of the end surfaces 42 of the blade portions 4.

In the above-mentioned turbo fan 1, the case where one group of the positioning ribs 20 is provided to the groove portion 31 (that is, the second component 8) is described. However, one group of the positioning ribs 20 may be provided to the end portion 41 of the blade portion 4 (that is, the first component 7), or equivalently one group of the positioning ribs 20 may be provided to the end portion 41 of at least one of the plurality of blade portions 4. In this case, the positioning ribs 20 are simply required to be configured in such a manner as to protrude in the thickness direction from the first blade surface 4L and the second blade surface 4R at the end portion 41 of the blade portion 4 and to be in contact with the side surfaces 33 of the groove portion 31.

Note that if one group of the positioning ribs 20 is provided to the blade portion 4, the one group of the positioning ribs 20 may be formed in such a manner as to protrude in the thickness direction from the first blade surface 4L and the second blade surface 4R not only at the end portion 41 but along the entire length of the blade portion 4 in the standing direction. In this case, an undercut (a protruding or recessed shape that cannot be released from a mold in the as-is state) is not formed on the first component 7. Hence, it is possible to easily mold the first component 7 and also to provide the turbo fan 1 that can obtain effects similar to the effects excluding (7) above. Moreover, as described above, if one group of the positioning ribs 20 is provided along the entire length of the blade portion 4 in the standing direction and subsequently shaved in such a manner as not to protrude from the clearances SL and SR, then it is also possible to obtain an effect similar to the effect of (7) above. If one group of the positioning ribs 20 is provided to the blade portion 4, the first component 7 may be formed by integrating the first flat portion 2 and the blade portions 4 into a single unit after the first flat portion 2 and the blade portions 4 are formed individually. In addition, if one group of the positioning ribs 20 is provided to the blade portion 4, the placement, shape, and number of the positioning ribs 20 in the above-mentioned embodiment may be employed, or those in the above-mentioned modifications may be employed.

In the above-mentioned turbo fan 1, the case where the first component 7 includes the first flat portion 2 and the plurality of blade portions 4, and the second component 8 includes the second flat portion 3 (the groove portions 31) is described. However, the shapes of the first and second components forming the turbo fan are not limited to the above-mentioned shapes. The first component may be formed by integrating an annular flat portion (a portion corresponding to the above-mentioned second flat portion 3) provided with a hole for an intake air guide path, and a plurality of blade portions, and the second component may include a flat portion (a portion corresponding to the above-mentioned first flat portion 2) that is placed facing the aforementioned flat portion in the axial direction. In this case, a plurality of groove portions is simply required to be provided to the flat portion of the second component. The first flat portion 2 and the second flat portion 3 are at least required to extend along a direction orthogonal to the rotation center C, or be slightly inclined relative to the aforementioned direction, or curved.

What is claimed is:

1. A turbo fan formed by welding together, by ultrasonic welding, a first component including: a flat portion that extends along a direction orthogonal to a rotation center; and a plurality of plate-shaped blade portions that is provided in such a manner as to stand from the flat portion and is provided around the rotation center in such a manner as to extend outward from the rotation center side, and a plate-shaped second component that is provided with a plurality of recessed groove portions in each of which an extended end portion of the respective blade portion fits, wherein
   the groove portions have a groove width greater than a thickness of the end portions of the blade portions,
   the turbo fan includes one group of positioning ribs that partially bury two clearances created on two sides of a respective end portion in a thickness direction thereof, in a state where the end portion fits in the groove portion,
   the one group of positioning ribs protrude in the thickness direction from the end portion of at least one of the plurality of blade portions and are in contact with side surfaces of the groove portion, or protrude in the thickness direction from side surfaces of at least one of the plurality of groove portions and are in contact with the end portion of the blade portion, and
   the positioning rib provided to one of the two clearances is equal in an amount of protrusion in the thickness direction to the positioning rib provided to the other clearance.

2. The turbo fan according to claim 1, wherein
   each of the blade portions includes a plurality of welding ribs that protrudes from an end surface of the respective end portion and is heated during the welding of the first component and the second component,
   the plurality of welding ribs extends discontinuously along an extending direction of the respective end portion, and
   the positioning ribs are located in a break between the plurality of welding ribs in the extending direction of the respective end portion, or are located in a break between the plurality of welding ribs in an extending direction of the groove portion in a state where the end portion fits in the groove portion.

3. The turbo fan according to claim 1, wherein the positioning ribs are in linear contact with the side surfaces of the groove portion in a depth direction of the groove portion, or are in linear contact with the respective end portion in a standing direction of the blade portion.

4. The turbo fan according to claim 1, wherein the positioning ribs have an arc shape as viewed in a direction of the rotation center.

5. The turbo fan according to claim 1, wherein
   the end portions of the blade portions have a curved shape as viewed in a direction of the rotation center,
   the one group of positioning ribs are provided in the groove portion, and
   the positioning rib provided in one of the two clearances and the positioning rib provided in the other clearance are arranged so as to each of the positioning ribs overlaps with a normal at a position where each of the positioning ribs abuts the respective end portion.

6. The turbo fan according to claim 1, wherein the positioning ribs do not protrude from the clearances in a direction of the rotation center.

7. The turbo fan according to claim 1, wherein the one group of positioning ribs are provided to each of the end portions of two or more blade portions located equally spaced around the rotation center among the plurality of blade portions, or to each of the groove portions in which the respective aforementioned end portions fit.

* * * * *